US008757215B2

(12) United States Patent
Burdy

(10) Patent No.: US 8,757,215 B2
(45) Date of Patent: Jun. 24, 2014

(54) RADIALLY COLLAPSIBLE AND EXPANDABLE TEXTILE SLEEVE AND METHOD OF CONSTRUCTION THEREOF

(75) Inventor: John E. Burdy, Elverson, PA (US)

(73) Assignee: Federal-Mogul Powertrain, Inc., Southfield, MI (US)

( * ) Notice: Subject to any disclaimer, the term of this patent is extended or adjusted under 35 U.S.C. 154(b) by 16 days.

(21) Appl. No.: 13/592,172

(22) Filed: Aug. 22, 2012

(65) Prior Publication Data

US 2013/0048139 A1 Feb. 28, 2013

Related U.S. Application Data

(60) Provisional application No. 61/525,967, filed on Aug. 22, 2011.

(51) Int. Cl.
*H02G 1/08* (2006.01)
*D03D 3/00* (2006.01)
*D03D 23/00* (2006.01)

(52) U.S. Cl.
USPC ............. 139/384 R; 139/383 R; 139/387 R; 139/404; 139/406; 139/426 R; 174/34; 174/36; 174/19

(58) Field of Classification Search
None
See application file for complete search history.

(56) References Cited

U.S. PATENT DOCUMENTS

| 3,476,870 | A | * | 11/1969 | Ross | 174/69 |
| 3,495,025 | A | * | 2/1970 | Ross | 174/70 R |
| 3,503,106 | A | * | 3/1970 | Port et al. | 264/103 |
| 3,657,856 | A | * | 4/1972 | Planner | 53/481 |
| 3,911,961 | A | * | 10/1975 | Peyton et al. | 138/113 |
| 4,108,934 | A | * | 8/1978 | Rubens et al. | 264/53 |
| 4,281,211 | A | * | 7/1981 | Tatum et al. | 174/36 |
| 4,572,922 | A | * | 2/1986 | Plummer, III | 174/36 |
| 4,681,783 | A | * | 7/1987 | Hyodo et al. | 428/36.1 |
| 4,842,736 | A | * | 6/1989 | Bray et al. | 210/321.61 |
| 4,946,722 | A | * | 8/1990 | Moyer | 428/36.1 |
| 5,178,923 | A | * | 1/1993 | Andrieu et al. | 428/36.1 |
| 5,180,458 | A | | 1/1993 | White | |
| 5,373,103 | A | * | 12/1994 | Orr et al. | 174/36 |

(Continued)

FOREIGN PATENT DOCUMENTS

| WO | 2007103779 A2 | 9/2007 |
| WO | 2007121210 A2 | 10/2007 |

OTHER PUBLICATIONS

International Search Report PCT/US2012/051791 mailed on Nov. 5, 2012.

*Primary Examiner* — Bobby Muromoto, Jr.
(74) *Attorney, Agent, or Firm* — Robert L. Stearns; Dickinson Wright, PLLC

(57) ABSTRACT

A textile sleeve for routing and protecting elongate members and method of construction thereof are provided. The sleeve has a wall of interlaced monofilament and/or multifilament yarns. Opposite edges of the wall extend along a central axis of the sleeve. The opposite edges are biased into a self-wrapping, overlapping relation with one another to bound a tubular cavity in an in-use first configuration. A plurality of elongate hinges formed with the interlaced yarns extend along the length of the sleeve in substantially parallel relation with the central axis, with the hinges separating relatively rigid, arcuate regions of the wall from one another. The hinges allow the arcuate regions to be moved from the expanded in-use tubular first configuration to a collapsed, second configuration nested with one another to allow significantly increased numbers of the sleeves to be shipped and stowed in a significantly reduced volume of space.

14 Claims, 1 Drawing Sheet

(56) References Cited

U.S. PATENT DOCUMENTS

| | | | |
|---|---|---|---|
| 5,413,149 A * | 5/1995 | Ford et al. | 138/123 |
| 5,843,542 A * | 12/1998 | Brushafer et al. | 428/36.1 |
| 5,918,885 A * | 7/1999 | Radke, II | 277/630 |
| 6,045,884 A * | 4/2000 | Hess et al. | 428/36.1 |
| 6,152,187 A * | 11/2000 | Lindblom | 139/11 |
| 6,233,796 B1 * | 5/2001 | van Wassenhove et al. | 28/100 |
| 6,340,510 B2 * | 1/2002 | Hess et al. | 428/36.1 |
| 6,371,645 B1 * | 4/2002 | Rusert et al. | 383/107 |
| 6,476,323 B2 * | 11/2002 | Beebe et al. | 174/72 A |
| 6,822,166 B2 * | 11/2004 | James et al. | 174/93 |
| 6,932,116 B2 * | 8/2005 | Smith et al. | 138/98 |
| 6,978,643 B2 * | 12/2005 | Akers et al. | 66/170 |
| 7,013,929 B2 * | 3/2006 | Laurent et al. | 138/123 |
| 7,070,089 B2 * | 7/2006 | Kim et al. | 229/101 |
| 7,216,622 B2 * | 5/2007 | Marks et al. | 123/195 C |
| 7,576,286 B2 * | 8/2009 | Chen | 174/117 M |
| 7,595,451 B2 | 9/2009 | Kircanski et al. | |
| 7,600,539 B2 * | 10/2009 | Malloy et al. | 139/387 R |
| 8,557,358 B1 * | 10/2013 | Hennings et al. | 428/36.1 |
| 2003/0234531 A1 * | 12/2003 | Silverman | 281/29 |
| 2004/0081411 A1 * | 4/2004 | Gladfelter et al. | 385/100 |
| 2004/0084203 A1 * | 5/2004 | Gladfelter et al. | 174/93 |
| 2006/0070598 A1 * | 4/2006 | Marks et al. | 123/195 C |
| 2006/0107437 A1 * | 5/2006 | Griesbach, III | 2/114 |
| 2007/0113971 A1 * | 5/2007 | Driver et al. | 156/287 |
| 2007/0210490 A1 * | 9/2007 | Malloy et al. | 264/425 |
| 2007/0235098 A1 * | 10/2007 | Driver | 138/98 |
| 2007/0243356 A1 * | 10/2007 | Baer et al. | 428/99 |
| 2008/0251151 A1 * | 10/2008 | Tanaka et al. | 138/98 |
| 2008/0295306 A1 * | 12/2008 | Despault | 28/142 |
| 2009/0218002 A1 * | 9/2009 | Kashihara | 139/433 |
| 2010/0012214 A1 * | 1/2010 | Kamiyama et al. | 138/98 |
| 2010/0106239 A1 * | 4/2010 | Roeder | 623/1.13 |
| 2010/0108176 A1 * | 5/2010 | Golz | 139/409 |
| 2010/0313989 A1 * | 12/2010 | Kashihara | 139/387 R |
| 2013/0052518 A1 * | 2/2013 | Harris et al. | 429/175 |
| 2013/0074975 A1 * | 3/2013 | Heilman | 139/388 |

* cited by examiner

RADIALLY COLLAPSIBLE AND EXPANDABLE TEXTILE SLEEVE AND METHOD OF CONSTRUCTION THEREOF

CROSS-REFERENCE TO RELATED APPLICATIONS

This application claims the benefit of U.S. Provisional Application Ser. No. 61/525,967, filed Aug. 22, 2011, which is incorporated herein by reference in its entirety.

BACKGROUND OF THE INVENTION

1. Technical Field

This invention relates generally to textile sleeves for protecting elongate members, and more particularly to self wrapping textile sleeves.

2. Related Art

It is known to wrap elongate members, such as pipes, wires and wire harnesses, in protective, self-wrapping textile sleeves, such as in automobiles, aircraft or aerospace craft, to provide protection to the elongate members against vibration, abrasion, fluid and thermal affects. The self-wrapping sleeves have opposite edges extending along the length of the sleeve that are typically biased into overlapping relation with one another to fully enclose a protected internal cavity in which the elongate members being protected are received. Although, at least in some applications, known textile sleeves can provide the protection desired, they typically occupy valuable empty space in shipping and in storage due to their having a relatively rigid tubular configuration upon being manufactured. As such, an increased area is needed to store the sleeves, and a relatively small number of the sleeves can be fit into a box for shipping. Accordingly, with the internal tubular cavity of the sleeves occupying valuable space, shipping and inventory costs tend to be high.

SUMMARY OF THE INVENTION

One aspect of the invention provides a textile sleeve for routing and protecting elongate members from exposure to abrasion and other environmental conditions, such as contamination. The sleeve has a wall that takes on a substantially tubular configuration in a first in-use configuration and a radially collapsed configuration in a second stowing/shipping position. Accordingly, valuable space is freed up to allow an increased number of the sleeves to be stowed and shipped while in the second configuration. The sleeve wall has interlaced monofilament and/or multifilament yarns to provide the wall with flexible, abrasion resistant, self-curling features. The wall has opposite edges extending generally parallel to a central axis of the sleeve, wherein the opposite edges are automatically biased into a self-curled, overlapping relation with one another, and thereby bounding a circumferentially enclosed tubular cavity while in the in-use configuration. To facilitate movement of the wall to the radially collapsed, second configuration, the wall has a plurality of increased flexibility regions formed as elongate hinges extending along the length of the sleeve in substantially parallel relation with the central axis, with relatively rigid, arcuate regions, in contrast to the hinges, extending between the hinges. The hinges are formed integrally within the wall by the interlaced yarns, such that no secondary materials are needed.

In accordance with another aspect of the invention, the wall is generally crescent shaped while in its second configuration.

In accordance with another aspect of the invention, the hinges provide over-center flex regions for the relatively rigid, arcuate regions, thereby allowing the relatively rigid, arcuate regions to snap from the tubular first configuration to the collapsed second configuration.

In accordance with another aspect of the invention, the hinges separate regions of the wall from one another with the regions being nested with one another when in the collapsed, second configuration.

In accordance with another aspect of the invention, the hinges are formed from the interlaced yarns of the wall.

In accordance with another aspect of the invention, the hinges have a first interlaced pattern and the adjacent regions of the wall have a second interlaced pattern, wherein the first and second interlaced patterns are different from one another.

In accordance with another aspect of the invention, the wall includes at least three regions separated from one another by the hinges.

In accordance with another aspect of the invention, at least some of the interlaced yarns of the wall and the hinges are heat-set to bias the opposite edges into overlapping relation with one another.

In accordance with another aspect of the invention, a method of constructing a textile sleeve is provided. The method includes interlacing a plurality of yarns with one another to form a wall of the sleeve having opposite edges extending generally parallel to a central axis of the sleeve. Further, heat-setting at least some of the yarns to automatically bias the opposite edges into self-curling, overlapping relation with one another to bound a circumferentially enclosed tubular cavity while in a first, in-use configuration. Further, forming a plurality of increased flexibility lines with the yarns during the interlacing process to provide elongate hinges extending along the length of the sleeve in substantially parallel relation with the central axis, with relatively rigid, arcuate regions, in contrast to the hinges, extending between the hinges.

In accordance with another aspect of the invention, the method further includes forming the hinges with the yarns of the wall.

In accordance with another aspect of the invention, the method further includes separating regions of the wall from one another with the hinges and bringing the regions into nested relation with one another when in the second configuration.

In accordance with another aspect of the invention, the method further includes forming the hinges having a first interlaced pattern and forming the arcuate regions having a second interlaced pattern that is different from the first interlaced pattern.

In accordance with another aspect of the invention, the method further includes forming the wall having at least three of the arcuate regions separated from one another by the hinges.

In accordance with another aspect of the invention, the method further includes forming a pair of the hinges in diametrically spaced relation with one another.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PRESENTLY PREFERRED EMBODIMENTS

Figure 1:
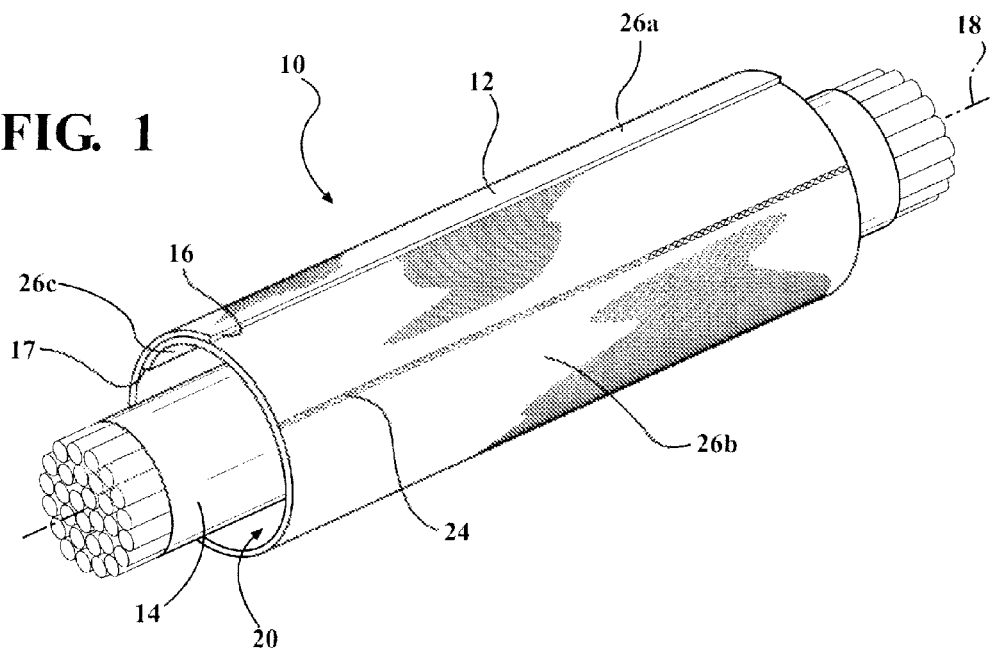
FIG. 1 is a schematic perspective view of a textile, self-wrapping sleeve constructed in accordance with one aspect of the invention shown in a first, in-use position carrying and protecting elongate members therein.
Figure 2:
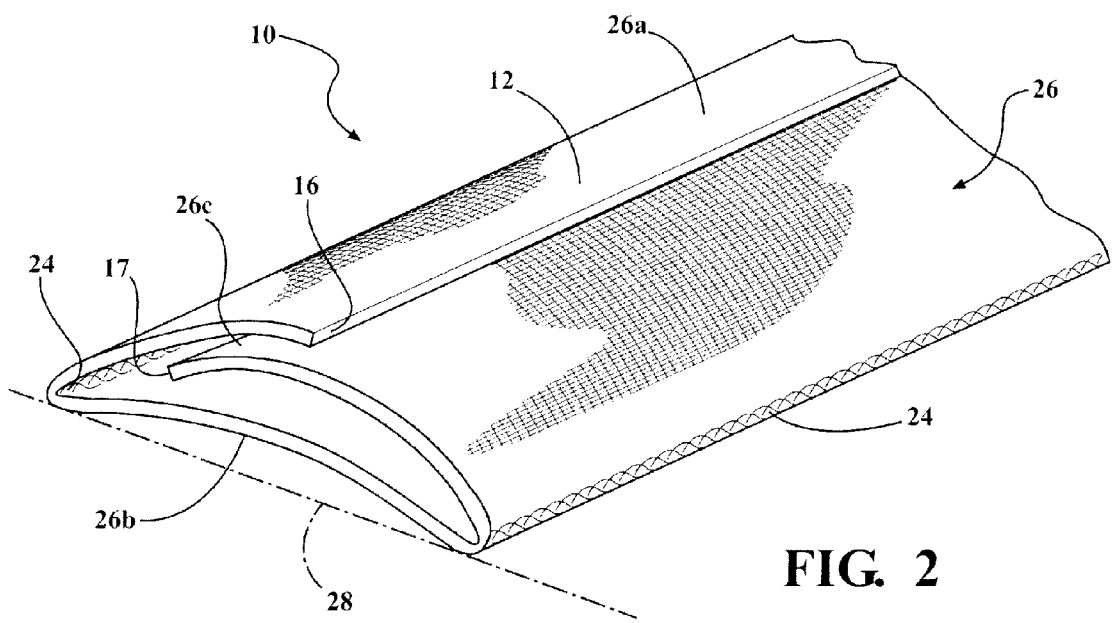
FIG. 2 is an enlarged, partial schematic perspective view of the sleeve of FIG. 1 shown in a second, collapsed position.

Referring in more detail to the drawings, FIG. 1 shows schematic representation of a textile, self-wrapping sleeve, referred to hereafter as sleeve 10, constructed in accordance with one aspect of the invention. The sleeve 10 has a self-wrapping elongate wall 12 for routing and protecting elongate members, such as pipes, wires or a wire harness 14, for example, from exposure to abrasion and the ingress of contamination, debris and the like. The elongate wall 12 has opposite edges 16, 17 extending along a length of the wall 12 generally parallel to a central, longitudinal axis 18, wherein the edges 16, 17 are preferably biased into overlapping relation with one another in "cigarette wrapped" fashion to a maintain a tubular configuration in-use, referred to as first configuration, as shown in FIG. 1, to fully enclose the elongate members 14 within a circumferentially bounded central cavity 20 of the sleeve 10. The cavity 20 is readily accessible along the full length of the longitudinal axis 18 so that the elongate members 14 can be readily disposed radially into the cavity 20, and conversely, removed from the cavity 20, such as during service. The sleeve wall 12 has interlaced monofilament and/or multifilament yarns, represented generally at 22, to provide the wall with flexible, abrasion resistant, self-curling features. To facilitate movement of the wall 12 to a radially collapsed, stowing/shipping configuration, referred to as second configuration, as shown in FIG. 2, the wall 12 has a plurality of increased flexibility regions formed as elongate hinges 24 extending along or substantially along the full length of the sleeve 10 in parallel or substantially parallel relation with the central axis 18. Relatively rigid, in contrast to the flexible hinges 24, heat-set arcuate regions 26, extend between the hinges 24. The hinges 24 are formed integrally within the wall 12 by manipulating the pattern of the interlaced yarns 22 of the wall 12 during construction of the wall 12, such that no secondary materials or hinge devices are needed to construct the sleeve 10. Accordingly, the manufacture process used to construct the sleeve 10 is streamline, efficient and economical.

The wall 12 can be constructed using any desired interlacing process, such as a weaving, knitting or braiding process (shown in the various forms of construction in FIG. 1). The self-wrapping bias is imparted within the wall 12 by heat-setting at least some circumferentially extending yarns 22, such as monofilaments of PET, for example, within the wall 12 into a curled configuration about the central axis 18. The heat-set is preferably imparted to at least some of the yarns within the arcuate regions 26, and can be imparted within at least some of the yarns of the reduced density hinges 24 as well without affecting the ability of the hinges to perform their intended function. The wall 12 is shown as having three discreet arcuate regions, also referred to as sections 26a, 26b, 26c, with a separate section 26a, 26c extending from each edge 16, 17 to respective hinges 24 circumferentially spaced from the edges 16, 17, and the third section 26b extending between the hinges 24. Accordingly, the wall 12 has at least three sections 26a, 26b, 26c separated from one another by the intervening hinges 24. The hinges 24 are shown as a pair of hinges arranged diametrically opposite one another, and thus, the third section 26b extends about 180 degrees in semi-circular fashion about the wall 12, by way of example.

With the arcuate regions 26 being heat-set, their tendency is to remain in their arcuate shape, absent some externally applied force. The central region 26b extending between the hinges 24, being arced, has an arc length greater than a straight cord 28 between the hinges 24, and thus, when the central region 26b is on one side of the cord 28 or the other, it tends to remain in that position until moved by an externally applied force sufficient to move the region 26b radially inwardly beyond the cord 28 over-center, whereupon the region 26b snaps beyond center to the opposite position. Thus, the hinges 24, being more flexible than the regions 26, allow the central region 26b to be moved radially between the in-use, first configuration and the collapsed, stowing/storage second configuration in snapping fashion. Of course, upon being moved to the collapsed, stowing/storage second configuration, the wall 12 can be readily moved to the in-use first configuration, when desired.

The flexibility of the hinges 24 is controlled by altering the type of interlacing pattern performed within the region of the hinges 24 relative to the type of interlacing pattern performed with the immediately adjacent arcuate regions 26. The regions 26 are formed having a first interlaced pattern and the hinges 24 are formed having a second interlaced patter, wherein the second interlaced pattern is more flexible than the first interlaced pattern. Patterns that provide enhanced flexibly of the hinges 24 and relative stiffness of the arcuate regions 26 will be understood by those skilled in the textile arts. Accordingly, whether woven, knit or braided, the yarns 22 within the hinges 24 are interlaced with one another via a weave, knit stitch or braid pattern that is different from that of the immediately adjacent portions of the arcuate regions 26.

Depending on the application needs, the wall 12 can be constructed having any suitable size, including length and diameter. The edges 16, 17 preferably overlap one another at least slightly to fully enclose the cavity 20, and thus, provide enhanced protection to the wires 14 contained in the cavity 20. The edges 16, 17 are readily extendable away from one another under an externally applied force sufficient to overcome the bias imparted by the heat-set yarns 24 to at least partially open and expose the cavity 20. Accordingly, the wires 14 can be readily disposed into the cavity 20 during assembly or removed from the cavity 20 during service. Upon releasing the externally applied force, the edges 16, 17 return automatically to their natural, overlapping self-wrapped position under the bias imparted by the heat-set yarns 24.

When the wall 12 is collapsed in the second configuration, the wall 12 takes on a trough shape, also referred to as crescent shape, as viewed along a length of the sleeve 10 from an end of the sleeve 10, as shown in FIG. 2. As such, the volume of space occupied by the sleeve 10 when in the collapsed second configuration is greatly diminished from the uncollapsed first configuration. As such, more sleeves 10 can be stowed within a given volume of space when in the collapsed, second configurations in comparison to the sleeve 10 when in its in-use, first configuration. To further save on space, a plurality of the sleeves 10, when in their second configuration, can be nested with one another, with a concave or convex surface of the sleeve regions 26a, 26c being brought into nesting contact with the mating concave or convex region 26b of an adjacent sleeve. It should be recognized that depending on how the wall 12 is collapsed, the sleeve regions 26a, 26b, 26c can take on one of a convex or concave shape, as shown in FIG. 2, but regardless, the sleeve regions 26a, 26b, 26c are formed so that they nest against one another to occupy less volume in comparison to that when they are in their uncollapsed first configuration. Accordingly, the number of sleeves 10 that are able to be contained within a given package is dramatically increased, thereby allowing significantly more sleeves 10 to be shipped within a given package size.

Obviously, many modifications and variations of the present invention are possible in light of the above teachings. It is, therefore, to be understood that within the scope of the appended claims, the invention may be practiced otherwise than as specifically described.

What is claimed is:

1. A textile sleeve, comprising:
   a wall constructed of interlaced yarns, said wall having opposite edges extending parallel to a central axis along a length of said wall, said opposite edges being biased into overlapping relation with one another; and
   said wall having a plurality of hinges extending substantially parallel to said central axis, said hinges separating heat-set arcuate regions of said wall from one another, each of said heat-set arcuate regions maintaining an arcuate shape absent some externally applied force, said hinges having an increased flexibility relative to said heat-set arcuate regions and extending along the length of said wall between said heat-set arcuate regions, said hinges facilitate movement of said wall between an in-use tubular, substantially cylindrical first configuration and a collapsed, crescent shaped second configuration, said heat-set arcuate regions being nested with one another when in said second configuration, wherein said wall remains in each of said first and second configurations absent some externally applied force.

2. The textile sleeve of claim 1, wherein said hinges are formed from said interlaced yarns.

3. The textile sleeve of claim 2 wherein said hinges have a first interlaced pattern and said regions have a second interlaced pattern, said first and second interlaced patterns being different from one another.

4. The textile sleeve of claim 3 wherein said second interlaced pattern is more flexible than said first interlaced pattern.

5. The textile sleeve of claim 1 wherein said regions include at least three of said arcuate regions separated from one another by said hinges.

6. The textile sleeve of claim 5 wherein said wall has a pair of said hinges.

7. The textile sleeve of claim 6 wherein said hinges are spaced diametrically opposite one another.

8. The textile sleeve of claim 1 wherein said interlaced yarns are heat-set to bias said opposite edges into overlapping relation with one another.

9. The textile sleeve of claim 1 wherein a pair of said hinges are spaced diametrically opposite one another.

10. A method of constructing a textile sleeve, comprising:
    interlacing yarns to form a wall having opposite edges;
    forming a plurality of hinges in the wall while interlacing the yarns, the hinges extending substantially parallel to a longitudinal central axis of the sleeve and separating discrete regions of the wall from one another, the hinges being formed having an increased flexibility relative to the discrete regions; and
    heating the wall to heat-set each of the discrete regions to take on and maintain an arcuate shape absent some externally applied force, wherein the hinges promote movement of the heat-set discrete regions between an in-use, substantially cylindrical first configuration and a collapsed, crescent shaped stowing second configuration, wherein each of the heat-set discrete regions are nested with one another when in the collapsed, crescent shaped stowing second configuration to facilitate nesting a plurality of the sleeves with one another, thereby reducing the volume of space occupied by the plurality of nested sleeves.

11. The method of claim 10 further including forming the hinges with the yarns of the wall.

12. The method of claim 11 further including forming the hinges having a first interlaced pattern and forming the arcuate regions having a second interlaced pattern that is different from the first interlaced pattern.

13. The method of claim 10 forming the wall having at least three of the arcuate regions separated from one another by the hinges.

14. The method of claim 13 further including forming a pair of the hinges in diametrically spaced relation with one another.

\* \* \* \* \*